United States Patent
Myllykoski

(10) Patent No.: US 11,585,062 B2
(45) Date of Patent: *Feb. 21, 2023

(54) DEVICE FOR COLLECTING WASTE FROM WATER

(71) Applicant: Clewat OY, Kokkola (FI)

(72) Inventor: Johannes Myllykoski, Kokkola (FI)

(73) Assignee: CLEWAT OY, Kokkola (FI)

( * ) Notice: Subject to any disclaimer, the term of this patent is extended or adjusted under 35 U.S.C. 154(b) by 0 days.

This patent is subject to a terminal disclaimer.

(21) Appl. No.: 17/294,388

(22) PCT Filed: Nov. 14, 2019

(86) PCT No.: PCT/FI2019/000020
§ 371 (c)(1),
(2) Date: May 15, 2021

(87) PCT Pub. No.: WO2020/099713
PCT Pub. Date: May 22, 2020

(65) Prior Publication Data
US 2022/0010515 A1    Jan. 13, 2022

(30) Foreign Application Priority Data

Nov. 15, 2018    (FI) ..................... 20187166

(51) Int. Cl.
*E02B 15/04*    (2006.01)
*B63B 35/32*    (2006.01)
(Continued)

(52) U.S. Cl.
CPC .......... *E02B 15/045* (2013.01); *B63B 35/32* (2013.01); *E02B 15/106* (2013.01); *E02B 15/107* (2013.01); *F04F 5/46* (2013.01)

(58) Field of Classification Search
CPC ..... E02B 15/045; E02B 15/106; E02B 15/107
(Continued)

(56) References Cited

U.S. PATENT DOCUMENTS 1,450,545  A  *  4/1923  Hans .................... E02B 15/106
                                                       210/122
3,578,171  A  *  5/1971  Usher .................. E02B 15/106
                                                       210/242.3
(Continued)

FOREIGN PATENT DOCUMENTS

FR        2804142 A1    7/2001
JP        H0588230 U   12/1993
(Continued)

OTHER PUBLICATIONS

Machine translation of SU 1773975, Nov. 1992 (Year: 1992).*
(Continued)

*Primary Examiner* — Christopher Upton
(74) *Attorney, Agent, or Firm* — Jacob Eisenberg

(57) ABSTRACT

A device having a funnel structure (connected to a separating arrangement by a base pipe is disclosed. The base pipe is horizontal and arranged between the funnel structure and the base pipe. The base pipe is also a vertical suction pipe. The device includes a pressure pipe which is parallel to the base pipe. The funnel structure is slightly below the water surface. In operation, water and floating waste pass over the edges of the funnel structure and swirl into the suction pipe. A jet of water may be injected through the pressure pipe to the base pipe. A flow gradient may then be formed in the base pipe and the differently sized waste objects may separate. If the water contains liquid waste, the speed of the water jet may be adjusted in such a way that the liquid waste and water do not form an emulsion.

11 Claims, 3 Drawing Sheets

(51) Int. Cl.
  *E02B 15/10*   (2006.01)
  *F04F 5/46*   (2006.01)
(58) Field of Classification Search
  USPC ... 210/170.05, 170.09, 170.11, 242.1, 242.3, 210/747.6, 776, 923
  See application file for complete search history.

(56) References Cited

U.S. PATENT DOCUMENTS

| | | | | |
|---|---|---|---|---|
| 3,730,346 | A * | 5/1973 | Prewitt | E02B 15/106 |
| | | | | 210/242.3 |
| 3,745,115 | A * | 7/1973 | Olsen | E02B 15/106 |
| | | | | 210/776 |
| 4,301,008 | A * | 11/1981 | Baffert | E02B 15/106 |
| | | | | 210/242.3 |
| 4,313,829 | A * | 2/1982 | Agar | E02B 15/045 |
| | | | | 210/242.3 |
| 5,197,263 | A * | 3/1993 | Midtling | A01D 44/00 |
| | | | | 210/242.3 |
| 6,375,835 | B1 * | 4/2002 | Lee | C02F 1/40 |
| | | | | 210/242.3 |
| 2020/0011020 | A1 * | 1/2020 | Ceglinski | E02B 15/106 |
| 2022/0098812 | A1 * | 3/2022 | Myllykoski | E02B 15/045 |

FOREIGN PATENT DOCUMENTS

| | | |
|---|---|---|
| JP | 2000006882 A | 1/2000 |
| KR | 101556558 B1 | 10/2015 |
| RU | 1773975 | * 11/1992 |

OTHER PUBLICATIONS

JPH0588230 (U) English Language Translation.
2804142 (A) English Language Translation.
JP2000006882 (A) English Language Translation.
KR101556558 (B1) English Language Translation.

* cited by examiner

DEVICE FOR COLLECTING WASTE FROM WATER

CROSS REFERENCE TO RELATED APPLICATIONS

This application is a national phase application of International Application no.: PCT/FI2019/000020, filed on Nov. 14, 2019, and claims the priority benefit of Finnish Application 20187166, filed Nov. 15, 2018, the content of both of which is incorporated herein by reference.

BACKGROUND OF THE INVENTION

The present disclosure relates to a device for collecting oil, plastic or similar waste material floating on or near the surface of the sea or a similar large body of water, the device comprising a funnel structure having: a funnel edge; a funnel surface and a bottom; a base pipe and a separating arrangement; and a hole in and/or at the bottom of the funnel, the hole being connected to the base pipe. The base pipe leads to the separating arrangement. The funnel edge is configured to be at least partly under the water surface when the device is in use. The device is further configured to move the water containing the waste material to the separating arrangement.

It is well-known that plastic waste gathers in bodies of water, such as at sea, with many harmful environmental, ecological and economical consequences. Many systems are suggested for removing plastic and other forms of solid waste.

A known system for cleaning and/or clearing away and/or removing from its current location solid waste floating on water includes a boat incorporating a submerged collection basket, the basket configured so that as the boat travels forward through the water, solid waste enters and otherwise becomes picked up within the basket, the basket then lifted onto the boat at certain intervals and subsequently disposed of on land such that the picked up waste finds itself on land where so disposed as oppose to in the water as before. This system features two basic drawbacks: a first being the fact that the emptying of the basket has to be carried out manually which can be labor and resource intensive; and, due to its weight, the removal of the basket and its storage on the boat can be problematic and burdensome, thereby requiring substantial physical effort. On the other hand, the basket in question is equipped with a large orifice through which the solid waste enters the basket, but, likewise, due to the effect of the waves and other such forces, exits the basket before being collected. A second reason for the waste to exit the basket after having being scoped up into it is the collection of the basket out of the water and its subsequent emptying on land which occurs only periodically thereby given the aforementioned forces time to empty the basket of its content, namely, the solid waste.

Similarly, collecting oil or a similar liquid from the surface of water can be problematic. A well-known system for cleaning oil spills at sea is a system comprising oil booms and rotating brushes. The booms guide and funnel the oil floating on the surface and the brushes which are configured to lift the oil onto a collection vessel. However, this system is quite inefficient, can be expensive to operate, and, in a worst case, breaks the oil slicks apart into small droplets (oil-water emulsion) which themselves become problematic to remove.

U.S. Pat. No. 5,047,156 discloses an oil recovery vessel having a multitude of oil separation tanks and a bow opening having an adjustable height weir for skimming oil, debris and other pollutants from the seawater for discharge into a separation tank. However, this system is quite cumbersome and difficult to adjust. Also, it is very difficult, if not impossible, to scale downwards.

There are a number of mechanical separating arrangements to separate from water and wastes, liquids and/or solids. These arrangements typically comprise tanks and weirs and such structures which collect waste materials. A feature which these structures have common is that the water must flow, and the speed of the water flow depends on what kind of waste the water contains and amount of the waste in the water. However, this flow is quite hard to control.

There is a clear need for a waste-collection device for use in bodies of water, such as at sea, that collect all kinds of waste material floating on or near the surface, which device should be simple, adjustable and easy to use.

BRIEF SUMMARY OF THE INVENTION

An object of the present disclosure is to provide a solution that can significantly reduce the disadvantages and drawbacks set out of the prior art. In particular, the object of the present disclosure is a solution where a device is provided that collects both solid and liquid waste.

An invention set out in the present disclosure is a device which has a funnel structure that is connected to a separating arrangement by a base pipe. The base pipe is horizontal and the connection between the funnel structure and the base pipe is implemented with a vertical suction pipe. At the connection point between the suction pipe and the base pipe is a pressure pipe which is parallel to the base pipe. When the device is in use, the funnel structure is situated in such a way that it is slightly below the water surface. Water and floating waste pass over the edges of the funnel structure and swirl into the suction pipe. A jet of water is injected through the pressure pipe to the base pipe. A flow gradient is formed in the base pipe and, if the water contains solid waste, the differently sized waste objects separate, and when the base pipe reaches the separating arrangement, the separation of the waste from the water is more efficient than that disclosed in the prior art. If the water contains liquid waste, the speed of the water flow or jet is adjusted in such a way that the liquid waste and water does not form an emulsion.

When reference is made in the text to the upper or the lower parts or respective directions such as down or up, a situation is described in which the device according to the invention is in use. Also, when reference is made to the vertical or horizontal directions or surfaces, the device is placed and/or oriented similarly.

An embodiment of the present disclosure is a device for collecting oil, plastic or similar waste material floating on or near the surface of the sea or a similar large body of water. The device comprises a funnel structure having a funnel edge, a funnel surface and a bottom, a base pipe and a separating arrangement. At the bottom of the funnel is a hole which is connected to the base pipe. The base pipe leads to the separating arrangement. The funnel edge is configured to be at least partly under the water surface when the device is in use, and the device is configured to move the water containing the waste material to the separating arrangement. In one advantageous embodiment of the present disclosure, the base pipe is horizontal, at least near the funnel structure. By the expression "near the funnel structure," it is meant that the base pipe (or some other part) is underneath the funnel structure. The device further comprises a suction pipe and a pressure pipe. The suction pipe comprises a first end and a second end. The first end of the suction pipe is fixed to the hole and the second end of the suction pipe is fixed to the base pipe in such a way that there is a curved wall below the hole. The pressure pipe is configured to blow a jet of water into the base pipe when the device is in use. The pressure pipe has an opening in the curved wall in such way that the longitudinal axis of the jet of water at the opening and the longitudinal axis of the base pipe are convergent. The diameter of the pressure pipe is smaller than the diameter of the base pipe.

In an embodiment of the present disclosure, the funnel structure comprises an adjustment arrangement for adjusting the position of the funnel edge in relation to the surface of the body of water when the device in in use. This feature alters the flow of water to the base pipe. The device can thus be adjusted to optimise it for different kinds of waste.

In another embodiment of the present disclosure, the diameter of the funnel is 2.5 to 5 times the diameters of the suction pipe and the base pipe. It has been determined that these ratios produce best results when moving waste into the funnel, namely, from the funnel to the suction pipe.

In another embodiment of the present disclosure, the slope of the funnel surface is between 5 to 20 degrees from the horizontal plane or level. It has been determined that these values give optimum results when guiding water to the hole.

In another embodiment of the present disclosure, the diameter of the suction pipe and the diameter of the base pipe are equal to or its variation is less than 10%. This feature prevents unwanted pressure changes in the base pipe.

In another embodiment of the present disclosure, the distance from the bottom of the funnel to the upper surface of the base pipe is equal to or larger than the radius of the base pipe. This feature prevents water from flowing upwards in some instances.

In another embodiment of the present disclosure, the opening of the pressure pipe is under the hole. This feature improves the formation of the flow gradient in the base pipe.

In another embodiment of the present disclosure, a nozzle is arranged on the opening of the pressure pipe. This feature makes it possible to have a faster jet of water emerging from the pressure pipe.

In another embodiment of the present disclosure, the pressure pipe has a curvature of over 60 degrees underneath the funnel structure. It has been determined that this feature further improves the effectiveness of the flow gradients. This is due, in part, to turbulence in the water jet caused by the curve.

In another embodiment of the present disclosure, the pressure pipe has a curvature of 180 degrees underneath the funnel structure, and some parts of the pressure pipe are parallel to the base pipe. It has been determined that this feature further improves the effectiveness of the flow gradients. This is due, in part, to turbulence in the water jet caused by the curvature. Also, this feature makes the structure compact. In another embodiment of the present disclosure, the distance to the water surface of at least part of the funnel edge is between 2 to 10 cm when the device is in use. This interval has been found to be most efficient when adjusting the flow of water into the device.

In another embodiment of the present disclosure, the diameter of the base pipe is two to five times greater than the diameter of the pressure pipe. The device further comprises an adjustable pump arrangement to control the pressure in the pressure pipe.

In another embodiment of the present disclosure, the pressure in the pressure pipe is configured to be between 0.2 and 1.5 bar when the waste material contains liquid waste.

This range has been found to be optimal when adjusting the flow gradient in the base pipe.

In another embodiment of the present disclosure, the pressure in the pressure pipe is configured to be adjustable in order to optimise it for the size or composition or both of the waste material to be collected.

In another embodiment of the present disclosure, the pressure in the pressure pipe is higher when the waste contains and/or includes big objects (with a diameter of greater than 2 cm) than in the situation when the collected waste comprises mainly liquid or small objects (with a diameter less than 2 cm) or both.

It is an advantage of the present disclosure and inventions disclosed therein to provide a device that is easy to use and applicable both to solid and liquid wastes, as well as combination of the two. Using the device significantly improves cleaning efficiency. It also produces a device that has no complex parts, so that it is easier to manufacture and maintain than devices according known techniques.

A still further advantage of the present disclosure is that it is quite efficient for collecting liquid wastes while preventing the mixing of water and the waste liquid (emulsification process). A device according to the present disclosure can also be easily and quickly assembled and disassembled. The device is also applicable for collecting both solid and liquid wastes. Its structure allows it to be used in low waters.

It is a further advantage of the present disclosure that it can be easily optimized for different situations, especially with respect to scalability.

The present disclosure also provides a device that does not easily clog. This means that it can be used on or in water areas where there is lots of algae. Such waters are usually been very hard to clean.

BRIEF DESCRIPTION OF THE SEVERAL VIEWS OF THE DRAWINGS

Further advantages features and details of the various embodiments of this disclosure will become apparent from the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, with departing from the scope of the disclosure In the following, invention(s) according to the present disclosure is and/or are described in detail. The description refers to the accompanying drawings, in which.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C.

The embodiments in the following description are given as examples only and a person skilled in the art can carry out the basic idea of the invention also in some other way than what is described in the description. Though the description may refer to a certain embodiment or embodiments in several places, this does not mean that the reference would be directed towards only one described embodiment or that the described characteristic would be usable only in one described embodiment. The individual characteristics of two or more embodiments may be combined and new embodiments of the invention may thus be provided.

Figure 1A:
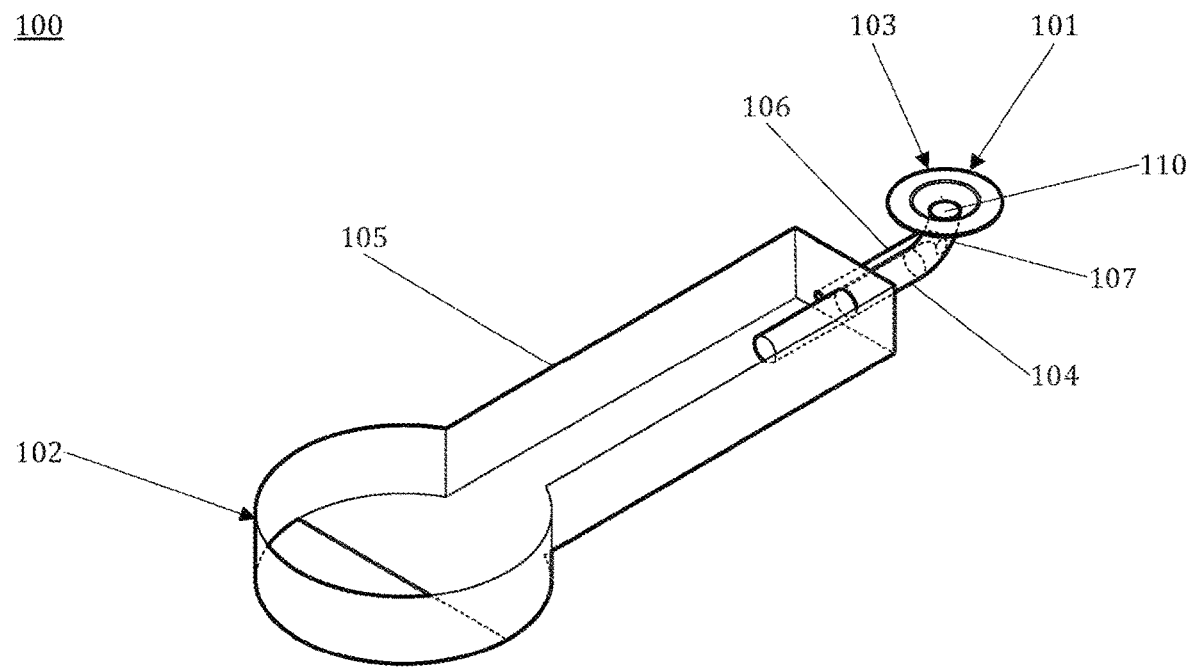
FIG. 1A depicts an example of a device according to an embodiment.
Figure 1B:
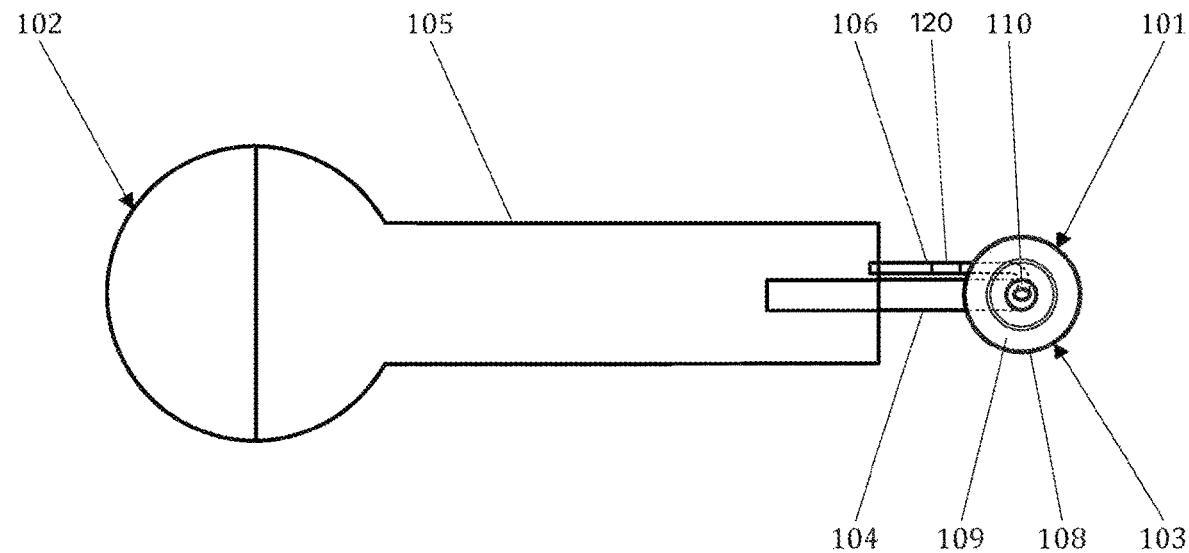
FIG. 1B depicts the device presented in FIG. 1A as seen from above.
Figure 1C:
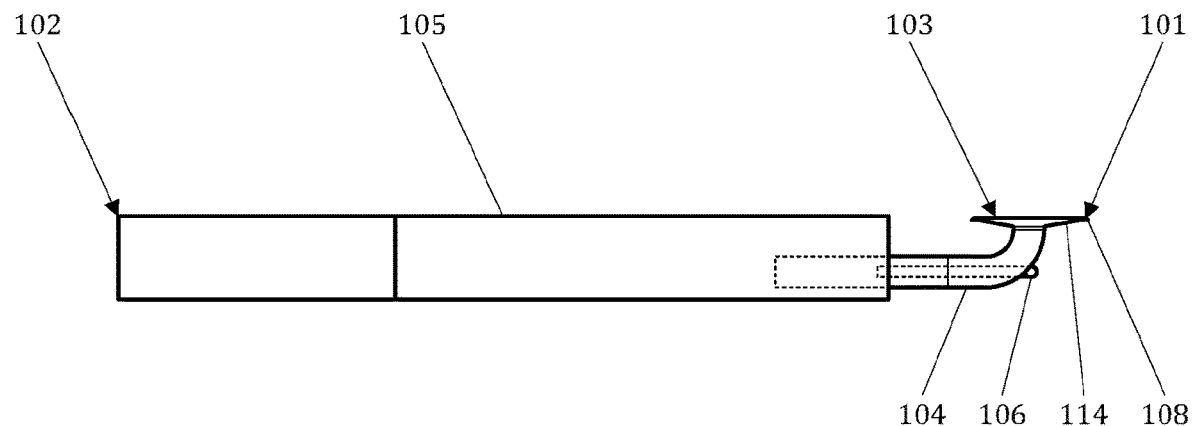
FIG. 1C depicts the device presented in FIG. 1A as seen from the side.

FIG. 1 depicts an embodiment of a device 100 for collecting oil, plastic or similar waste material floating on or near the surface of the sea or a similar large body of water. FIG. 1A depicts an overview of the device. FIG. 1B depicts the device from above. FIG. 1C depicts the device from the side. The structure of the device presented in these figures is simplified for sake of the clarity.

At least in the aforementioned examples, the device 100 is an elongated structure having a first end 101 and a second end 102. The device comprises a funnel structure 103, a base pipe 104, a separating arrangement 105, a pressure pipe 106, and a suction pipe 107. The funnel structure is arranged at the first end of the device and the separating arrangement is arranged at the second end of the device. The funnel structure collects water and waste, and they are separated in the separating arrangement. The waste is stored, and the cleaned water is in most cases released back into the sea. The device is configured to be set on a vessel or on two or more vessels i.e., parts of the device can be implemented in or on separated places. For guiding waste containing surface waters near the funnel structure there can be boons or similar structures.

At the first end 101 of the device 100 the funnel structure 103 is arranged. The funnel structure comprises a funnel edge 108, a funnel surface 109, a bottom 114 and a hole 110 in the bottom. The funnel structure as seen from above is a circular structure having a diameter. The funnel surfaces slope towards the center point of the funnel structure, i.e., when the device is in use, the center of the funnel structure is deeper below the water surface than the funnel edge. The funnel structure may be configured as a downward narrowing cone. The bottom is the lowest part of the funnel structure. The hole is in the center of the funnel at the bottom. The funnel edge is configured to be at least partly under the surface when the device is in use. In some embodiments there is some guidance arrangements or such on the funnel edge. When the funnel edge is under the water surface, water, and the waste in it, pass over the edges of the funnel structure and swirl towards the center of the funnel and the hole situated there. In some embodiments there are some collar structures around the edges of the funnel structure. These collar structures are configured to ease waves and water movement near the funnel edge 108.

In some embodiments the slope of the funnel surface 109 is between 5 to 20 degrees from the horizontal plane or level. It has been determined that if the slope is too small, the flow of the water into and to the funnel structure and into and to the hole 110 is too slow, and the waste gathering may also slow. However, if the slope is too steep, water flow may form a vortex above the hole 110, and the moving of the water and the waste through the hole into the suction pipe 107 may slow down.

The distance from the water surface to at least part of the funnel edge is between 2 to 10 cm when the device is in use. In some embodiments the distance is constant. In some embodiments the funnel structure 103 comprises an adjustment arrangement for adjusting the position of the funnel edge 108 in relation to the surface of the body of water when the device in in use.

The suction pipe 107 is vertical and it is connected to the hole 110 in such a way that water from the funnel structure can flow into the suction pipe. In some embodiments the suction pipe is inclined towards the second end 103. The diameter of the hole is equal to the diameter of the suction pipe. The base pipe 104 leads to the separating arrangement 105. The base pipe is horizontal. The diameter of the base pipe is equal to the diameter of the suction pipe. In some embodiments the variation of their diameters is less than 10%. The suction pipe is fixed to the base pipe in such a way that there is a curved wall below the hole. The curvature guides the water into the base pipe in a such way that turbulence is minimized.

To make the water flow stable, i.e., to prevent the slowing of the velocity of the water flow in the base pipe 104 and to control the properties of the water flow (for example amount, speed and turbulence), the pressure pipe 106 may be configured to blow a jet of water into the base pipe when the device is in use. The pressure pipe has an opening in the curved part of the wall below the hole 110. The pressure pipe and the opening are configured in a such way that, near the funnel structure, the longitudinal axis of the jet of water at the opening and the longitudinal axis of the base pipe are convergent. This means that the jet of water is directed towards the center of the base pipe. The diameter of the pressure pipe is smaller than the diameter of the base pipe. In some embodiments the diameter of the base pipe is two to five times greater than the diameter of the pressure pipe. The device 100 comprises an adjustable pump arrangement 120 to control the pressure in the pressure pipe. The pump arrangement can be in the vessel where the device is placed. It can also be in the separating arrangement 105. In some embodiments, if the device is configured to collect liquid wastes or combination of liquid and solid wastes, the pressure the pump arrangement produces in the pressure pipe is advantageously between 0.2 and 1.5 bar. The jet of water enhanced water flow in the base pipe prevents cloggings of solid wastes in pipes.

The pressure in the pressure pipe 106 is adjustable in order to optimise it in regard to size, composition, or both with respect to the waste material to be collected. In some embodiments the pressure in the pressure pipe is higher when the waste containing large objects (with a diameter greater than 2 cm) compared to a situation where the collected waste comprises mainly liquid or small objects (with a diameter less than 2 cm) or both. Also, if the water contains significant quantities of algae, the pressure may be increased. In some embodiments there is a nozzle at the opening of the pressure pipe. The nozzle can be used for increasing the velocity of the jet of water. It has the same effect as increasing the pressure in the pressure pipe. The nozzle can also be used for directing the jet of water and reducing the diameter of the jet of water.

The jet of water from the pressure pipe 106 increases the suction of the suction pipe 107. It also increases the amount of water in the base pipe 104. Also, in many embodiments, the speed of the jet of water is greater than the speed of the water coming from the suction pipe 107, and this speed difference provides a flow gradient in the base pipe 104. It has been determined that having a flow gradient in the base pipe (or at least in first end 101 of the device 100) improves the separation of the wastes (both solid and liquid) from the water in the separating arrangement 105. By adjusting the jet of water, the water flow properties of the funnel structure can be adjusted, and, at the same time, the waste handling properties of the whole device 100. In some embodiments, the distance from the bottom 114 of the funnel to the upper surface of the base pipe, i.e., the length of the suction pipe, is at least equal to or exceeds the radius of the base pipe or more. If the suction pipe is shorter, the water may in some cases start to flow upwards from the base pipe and the pressure pipe through the suction pipe.

In some embodiments, the diameter of the funnel is 2.5 to 5 times the diameters of the suction pipe and the base pipe. It has been determined that these relations are best for flow properties of the funnel structure 103.

In some embodiments, the pressure pipe 106 has a curvature of 60 degrees or more underneath the funnel structure 103. The water in the pipe experiences rotational movements in the curvature. When the curvature is near the opening of the pressure pipe, the jet of water has a rotational velocity component. It has been found that this improves the flow gradient in the base pipe in such a way that the efficiency of the device increases. This is especially evident when the waste to be removed contains both liquid and solid components or when the solid waste comprises many sizes. In some embodiments, good results are achieved when the curvature is 80 to 100 degrees.

In some embodiments of the device 100, the pressure pipe 106 has a curvature of 180 degrees underneath the funnel structure, and some parts of the pressure pipe are parallel to the base pipe 104. This means that the pressure pipe comes from the direction of the separating arrangement 105. It has been found that this improves the flow gradient in the base pipe in such a way that the efficiency of the device increases and also the structure of the device is more compact. In some embodiments the curvature in continuous. In some embodiments the maximum radius of the curvature is four times the diameter of the pressure pipe. In this example the pressure pipe is on the same level as the center line of the base pipe.

The base pipe 104 leads the collected water to the separating arrangement 105. The separating arrangement 105 can be implemented in many ways. There can be tanks, sieves and weirs and some active arrangements such as conveyers. The separating arrangement can be in separate parts and cleaning of water is executed in phases. The cleaned water can be released back into the sea. Some of it can be pumped back into the pressure pipe 106. The collected waste is stored on the vessel.

Figure 2:
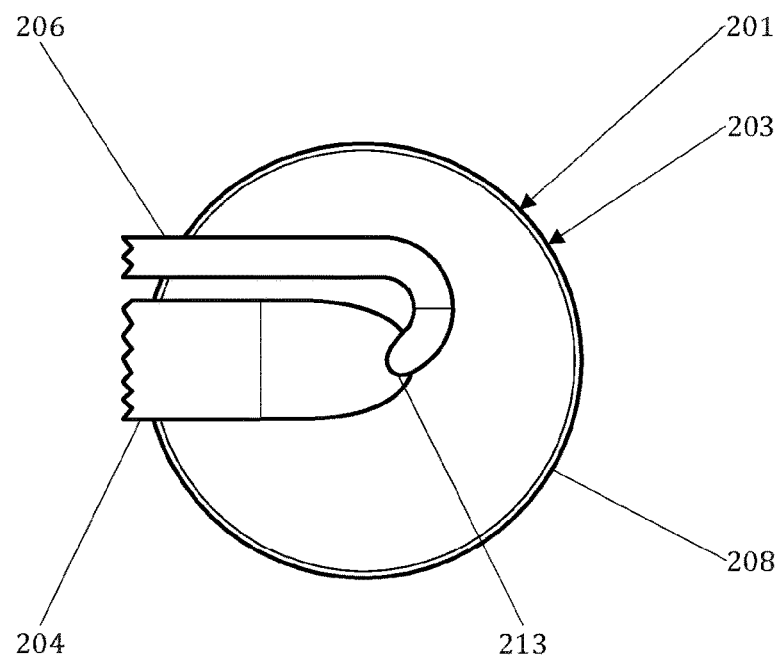
FIG. 2 depicts an example of an end of a device where the funnel structure is situated according to an embodiment as seen from below.

FIG. 2 shows an example of a first end 201 of a device according to an embodiment of the present disclosure. The device comprises a funnel structure 203, a base pipe 204 and a pressure pipe 206. The funnel structure has a circular edge 208. The water to be cleaned is collected by the funnel structure and guided to the base pipe. To maintain suction and flow in the base pipe, the the jet of water is forced from the pressure pipe. In this example, the pressure pipe is parallel to the base pipe until the pressure pipe reaches a 180-degree curvature and it is connected to the base pipe. In the connection point an opening is arranged which is under the center of the funnel structure. The pressure pipe and the opening are configured in a such way that the longitudinal axis of the jet of water at the opening and the longitudinal axis of the base pipe is congruent.

Figure 3:
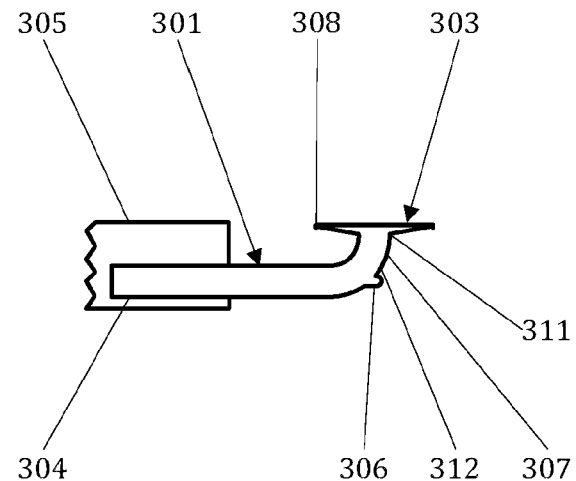
FIG. 3 depicts a second example of an end of a device where the funnel structure is situated according to an embodiment as seen from the side.

FIG. 3 depicts a first end 301 of a device according to an embodiment of the present disclosure. As depicted, the device comprises a funnel structure 303, a base pipe 304, a pressure pipe 306, a suction pipe 307 and a separating arrangement 305. The funnel structure has a circular edge 308 and has an upwards opening conelike cross section with a hole in the center of the funnel structure. The suction pipe has a first end of the suction pipe 311 and a second end of the suction pipe 312. The first end of the suction pipe is connected to the hole and the second end of the suction pipe is connected to the base pipe. In some embodiments the suction pipe is vertical, but it can also be inclined towards the separating arrangement, i.e. the second end of the suction pipe is nearer to the separating arrangement than the first end of the suction pipe. The base pipe and the pressure pipe combination is curved in such a way that the inner wall of the pipe is curved, i.e., there are no such sharp angles which could cause unwanted turbulences in the water flow in the pipe combination. At least the outer wall of the curvature is curved. The pressure pipe is connected to the curved wall in such a way that the opening of the pressure pipe to the base pipe and the pressure pipe combination are underneath the hole when the device is in use. The speed of the jet of water coming from the opening of the pressure pipe is faster than the speed of the water coming from the suction pipe. This speed differences cause a flow gradient in the base pipe. The flow gradient has been found to have beneficial effects on and for the cleaning process. The separation process starts in the base pipe and thus the whole efficiency of the device is improved. Also the flow gradient can be adjusted such that liquid waste does not form an emulsion with the water.

Figure 4:
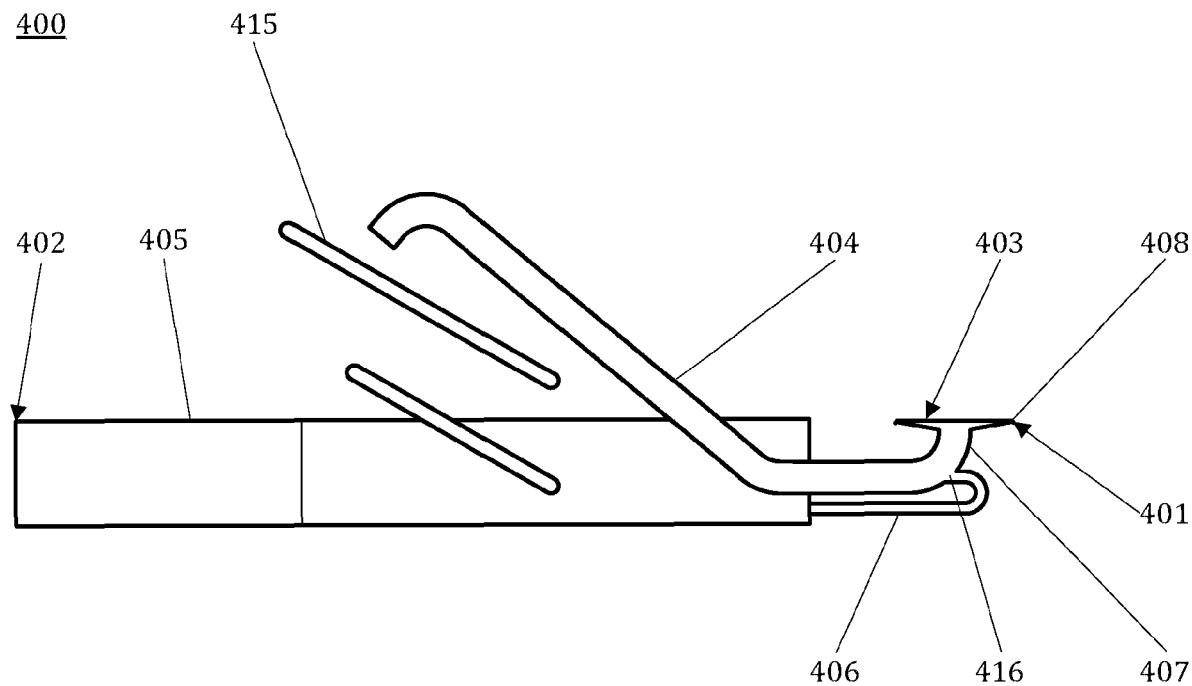
FIG. 4 depicts a second example of a device according to an embodiment as seen from the side.

FIG. 4 depicts an embodiment of device 400. The device is an elongated structure having a first end 401 and a second end 402. The device comprises a funnel structure 403, a base pipe 404, a separating arrangement 405, a pressure pipe 406 and a suction pipe 407. The funnel structure comprises a funnel edge 408, a bottom and a hole in the bottom in the center of the funnel structure. The inner surfaces of the funnel structure slope towards the hole. The pressure pipe has an opening 416. The separating arrangement comprises some separating structures 415. The separating structures are configured to separate wastes from the water. What kind of separating structures are to be used depends on the composition of the wastes to be removed from the water. If these are both liquid and solid wastes, the separating structures can comprise a combination of sieve-like conveyers for solid waste and weir tanks for liquids. The pressure pipe provides a jet of water into the base pipe for (among other previously mentioned features) increasing pressure and flow in the base pipe. This allows the exhaust end of the base pipe in the separating arrangement to be placed higher than the feeding end of the pressure pipe at the first end 401 of the device. In this embodiment, the pressure pipe is under the base pipe and has a curvature that places the opening of the pressure pipe under the hole and in a such way that the jet of water coming from the opening 416 has a longitudinal axis that is convergent to and/or on the longitudinal axis of the base pipe. In some embodiments, the longitudinal axis of the jet of water is at least parallel to the longitudinal axis of the base pipe. The pressurized water to the pressure pipe is provided with a pump arrangement.

Some advantageous embodiments of the device according to the invention have been described above. The invention is however not limited to the embodiments described above, as the inventive idea can be applied in numerous ways within the scope of the claims.

The invention claimed is:

1. A device for collecting waste material floating on or near a water surface, the device comprising:
   a funnel structure having a funnel edge, a funnel surface and a bottom, a base pipe, a pressure pipe and a separating arrangement,
   a hole arranged in the bottom of the funnel structure, the hole configured to be connected to the base pipe,
   wherein the base pipe leads to the separating arrangement, and the base pipe is configured to be horizontal at least near the funnel structure,
   wherein the pressure pipe is configured to blow a jet of water into the base pipe when the device is in use, and wherein the diameter of the pressure pipe is smaller than the diameter of the base pipe,
   wherein the funnel edge is arranged at least partly under the surface when the device is in use,
   wherein the device is further configured to move water containing waste material to the separating arrangement, and the device further comprises a suction pipe having a first end fixed to the hole and a second end fixed to the base pipe to configure a curved wall below the hole,
   wherein the diameter of the suction pipe and the diameter of the base pipe are equal or comprise a variation in their diameters of less than 10%,
   wherein the pressure pipe comprises an opening arranged in the curved wall such that a longitudinal axis of the jet of water at the opening and a longitudinal axis of the base pipe are convergent and a jet of water is aimed to the center of the base pipe and
   wherein a slope of the funnel surface is between 5 to 20 degrees with respect to a horizontal plane.

2. The device according to claim 1, wherein the diameter of the funnel is 2.5 to 5 times the size of diameters of at least one of the suction pipe and the base pipe.

3. The device according to claim 1, wherein the distance from the bottom of the funnel to the upper surface of the base pipe is at least equal to or exceeds a radius of the base pipe.

4. The device according to claim 1, wherein the opening of the pressure pipe is arranged under the hole.

5. The device according to claim 1, further comprising a nozzle arranged at an opening of the pressure pipe.

6. The device according to claim 1, wherein the pressure pipe comprises a curvature of over 60 degrees underneath the funnel structure.

7. The device according to claim 1, wherein the pressure pipe comprises a curvature of 180 degrees underneath the funnel structure, and wherein parts of the pressure pipe are parallel to the base pipe.

8. The device according to claim 1, wherein a distance from a water surface at at least part of the funnel edge is between 2 to 10 cm when the device is in use.

9. The device according to claim 1, wherein a diameter of the base pipe is two to five times greater than a diameter of the pressure pipe, and the device further comprises an adjustable pump arrangement configured and arranged to control pressure in the pressure pipe.

10. The device according to claim 9, wherein pressure in the pressure pipe is higher, when the waste contains objects having a diameter greater than 2 cm than when the waste comprises liquid or small objects having a diameter less than 2 cm.

11. The device according to claim 9, wherein the pressure in the pressure pipe is between 0.2 and 1.5 bar when the waste material contains liquid waste.

* * * * *